United States Patent
Hill et al.

[15] 3,678,172
[45] July 18, 1972

[54] ALLETHRONYL ESTERS OF CERTAIN CYCLOPROPANE-CARBOXYLIC ACIDS AS INSECTICIDES

[72] Inventors: Ira D. Hill, Middlesex; Barid B. Mukherjee, Piscataway; Dale G. Brown, Middlesex, all of N.J.

[73] Assignee: Tenneco Chemicals, Inc.

[22] Filed: Feb. 3, 1970

[21] Appl. No.: 8,387

[52] U.S. Cl. ........................................... 424/306
[51] Int. Cl. .............................................. A01n 9/24
[58] Field of Search .......................... 424/186, 306

[56] References Cited

UNITED STATES PATENTS 3,567,740 3/1971 Matsui et al. .................... 424/306

OTHER PUBLICATIONS

Chemical Abstracts, Vol. 66 (1967) p. 85866x; Vol. 67 (1967) p. 43928j

Primary Examiner—Albert T. Meyers
Assistant Examiner—Vincent D. Turner
Attorney—Daniel J. Reardon, George E. Lilly and Evelyn Berlow

[57] ABSTRACT

Insecticidal compositions contain as their active ingredient allethronyl esters of 2,2-dichloro-3,3-dimethylcyclopropanecarboxylic acid and certain other cyclopropanecarboxylic acids.

10 Claims, No Drawings

ALLETHRONYL ESTERS OF CERTAIN CYCLOPROPANE-CARBOXYLIC ACIDS AS INSECTICIDES

This invention relates to insecticidal compositions and to their use in the control of insects. More particularly, it relates to the control of insects using insecticidal compositions that comprise allethronyl esters of certain cyclopropanecarboxylic acids.

In accordance with this invention, it has been found that allethronyl esters of certain cyclopropanecarboxylic acids are useful as insecticides. These esters have the structural formula

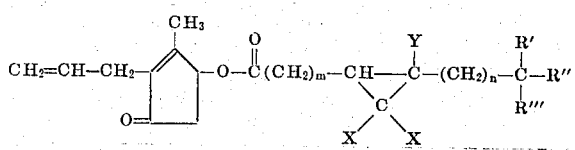

wherein each X represents methyl or chlorine; Y represents hydrogen or methyl; R' represents hydrogen, hydroxyl, or methyl; R'' represents hydrogen, $-(CH_2)_n-COOH$, $-(CH_2)_n-COOCH_3$, $-CH_2R'$, $-CH_2OCH_3$, $-CH_2OCOH$, or $-COCH_3$; R''' represents hydrogen, $-COOR'$, or $-COCH_3$; and m and n each represent an integer in the range of 0 to 1. Illustrative of these compounds are the allethronyl esters of the following acids: 2,2-dichloro-3,3-dimethylcyclopropanecarboxylic acid, 2,2-dimethyl-3-($\beta,\beta$-diacetylethyl)-cyclopropanecarboxylic acid, 2,2-dimethyl-3-($\beta$-acetyl-$\gamma$-acetylpropanoyl)-cyclopropanecarboxylic acid, 2,2-dimethyl-3-($\beta$-hydroxymethyl-$\beta$-carboxyethyl)-cyclopropanecarboxylic acid, 2,2-dimethyl-3-($\beta$-hydroxymethyl-$\beta$-acetoxyethyl)-cyclopropanecarboxylic acid, 2,2-dimethyl-3-($\beta$-formylmethyl-$\beta$-acetoxyethyl)-cyclopropanecarboxylic acid, 2,2-dimethyl-3-($\beta$-methyl-$\beta$-hydroxy-$\beta$-acetoxyethyl)-cyclopropanecarboxylic acid, 2,2-dimethyl-3-($\beta$-oxopropyl)-cyclopropanecarboxylic acid, and the like. One of the allethronyl esters may be present in the insecticidal compositions of this invention.

The novel insecticidal compounds may be prepared by an suitable means. For example, they may be prepared by the reaction of allethrolene with the appropriate acid anhydride in a solvent, such as xylene or petroleum ether. The acid anhydrides and acid chloride may be prepared from the acids by known procedures. The acids that are used in the preparation of the acid anhydrides and acid chlorides are cyclopropanecarboxylic acids that have the structural formula

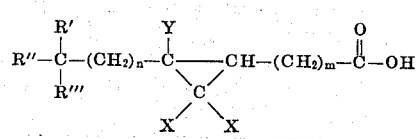

wherein R', R'', R''', X, Y, m, and n have the aforementioned significance. The acids may be prepared by any suitable procedure. For example, the 2,2-dimethyl-3-substituted cyclopropanecarboxylic acids may be prepared by converting $\delta^3$-carene to a $\delta^2$-carene having an acetyl, hydroxyl, hydroxymethyl, or acetoxymethyl group in the 4-position, ozonizing this 4-substituted-$\delta^2$-carene to form a keto-aldehyde, and oxidizing the keto-aldehyde with an oxidizing agent, such as oxygen or potassium permanganate to the corresponding carboxylic acid. 2,2-Dichloro-3,3-dimethylcyclopropanecarboxylic acid and other 2,2-dichloro-3-alkylcyclopropanecarboxylic acids may be prepared by reacting a diolefin with dichlorocarbene in the presence of a base to form a 1-alkenyl-2,2-dichloro-3-alkylcyclopropane, and oxidizing this intermediate first to the corresponding aldehyde and then to the carboxylic acid. These processes are described in detail in our copending patent applications Ser. No. 8,401 and Ser. No. 8,410, both of which were filed on Feb. 3, 1970.

While the insecticidal compounds of this invention may be used as such in the control of insects, they are usually and preferably used in combination with an inert carrier that facilitates the dispensing of dosage quantities of the insecticide and assists in its absorption by the insects. The insecticides may be mixed with or deposited upon inert particulate solids, such as fullers earth, talc, diatomaceous earth, hydrated calcium silicate, kaolin, and the like, to form dry particulate compositions. Such compositions may, if desired, also contain surface-active agents such as an alkyl sulfate or a sulfosuccinate. The insecticidal compounds are preferably dispensed in the form of solutions or dispersions of the esters in inert organic solvents or water or in the form of oil-in-water emulsions. The concentration of the insecticide in the composition may be varied within wide limits and depends upon a number of factors, the most important of which are the insects being treated and the rate at which the composition is to be applied. In most cases the composition contains about 0.1 percent to 85 percent by weight of one or more of the aforementioned esters.

If desired, the insecticidal compositions may also contain other insecticides, such as chlordane or benzene hexachloride; fungicides, such as sulfur and the metal dimethyl dithiocarbamates; or plant nutrients, such as urea, ammonium nitrate, and potash.

The insecticidal compositions of this invention can be used for controlling a wide variety of insects. The terms "insects" and "insecticide" are used herein in their broad common usage and include invertebrate animals belonging to the class Insecta as well as spiders, mites, lice, nematodes, and the like.

The invention is further illustrated by the examples that follow.

EXAMPLE 1

Seven grams of 2,2-dichloro-3,3-dimethylcyclopropanecarboxylic acid was added to 20 ml. of acetic anhydride. The mixture was heated until the temperature had risen to 150° C. and unreacted acetic anhydride and byproduct acetic acid had been distilled off. The residue was distilled under vacuum. About 3 grams of the anhydride of 2,2-dichloro-3,3-dimethyl-cylopropane-carboxylic acid, which distilled at 115° C./20 mm. Hg., was obtained.

A mixture of 3 grams of the anhydride, 1.5 grams of allethrolone, and 6 ml. of xylene was heated at its reflux temperature for about 18 hours. The xylene solution was extracted twice with a 10 percent aqueous potassium hydroxide solution and twice with water. The xylene solution was dried over sodium sulfate and then evaporated to dryness at 65° C. under water aspirator pressure. The residue was heated at 100° C. at 0.5 mm. Hg pressure, and the pure allethrolone ester of 2,2-dichloro-3,3-dimethylcyclopropane-carboxylic acid was obtained by sublimation. The structure of the product was confirmed by thin layer chromatography.

EXAMPLE 2

A mixture of 6.8 grams of 2,2-dimethyl-3-($\beta$-formylmethyl-$\beta$-acetoxyethyl)cyclopropanecarboxylic acid, 4.5 grams of thionyl chloride, and 100 ml. of petroleum ether was heated at its reflux temperature for 3 days. The reaction mixture was then heated under reduced pressure to remove the petroleum ether. To the residue was added 4.0 grams of allethrolone, 60 ml. of dry benzene, and 8 ml. of dry pyridine. The reaction mixture was allowed to stand at room temperature for 18 hours. It was then extracted with benzene, washed with dilute hydrochloric acid, washed with water, dried over sodium sulfate, and then heated under reduced pressure to remove the benzene. There was obtained 7.4 grams of the allethrolone ester of 2,2-dimethyl-3-($\beta$-formylmethyl- $\beta$acetoxyethyl)cyclopropanecarboxylic acid. The structure of the ester was confirmed by thin layer chromatography.

EXAMPLES 3–8

Allethrolone esters of the following acids were prepared by the procedure described in Example 2:

Ex. 3 2,2-dimethyl-3-(β,β-diacetylethyl)-cyclopropanecarboxylic acid

Ex. 4 2,2-Dimethyl-3-(β-acetyl-γ-acetylpropanoyl)-cyclopropanecarboxylic acid

Ex. 5 2,2-Dimethyl-3-(β-oxopropyl)-cyclopropanecarboxylic acid

Ex. 6 2,2-Dimethyl-3-(β-hydroxymethyl-β-carboxyethyl)-cyclopropanecarboxylic acid Ex. 7 2,2-Dimethyl-3-(β-hydroxymethyl-β-acetoxyethyl)-cyclopropanecarboxylic acid Ex. 8 2,2-Dimethyl-3-(β-methyl-β-hydroxy-β-acetoxymethyl)-cyclopropanecarboxylic acid Ex. 9 Isopyrethric acid

EXAMPLE 10

A series of tests was carried out to determine the effectiveness of the product of Example 1 in the control of various insects. In the tests on houseflies and boll weevils, the insects in cages were sprayed with aqueous solutions of the product of Example 1. In the tests on Mexican bean beetle and Southern army worm, aqueous solutions of the test compound were applied to plants infested with these insects. The amounts of the compound applied and the results obtained after 48 hours are summarized in Table I.

TABLE I

| | % Control of Insects | | | |
|---|---|---|---|---|
| Insecticide | Product of Ex. 1 | | Allethrin | |
| Rate of Application (ppm) | 500 | 125 | 500 | 125 |
| % Control of | | | | |
| Southern Army Worm | 50 | 20 | 100 | 80 |
| Mexican Bean Beetle | 100 | 100 | 100 | 100 |
| Houseflies | 100 | 45 | 100 | 100 |
| Boll Weevil | 40 | 0 | 100 | 60 |

EXAMPLE 11

A series of tests was carried out in which houseflies in cages were sprayed with aqueous solutions of the insecticidal compounds of this invention. In each case the houseflies were contact with 500 ppm of the insecticidal compound. The knockdown after 15 minutes and after 1 hour and the mortality rate after 48 hours of the houseflies are set forth in Table II.

TABLE II

Activity of Allethronyl Esters of

Cyclopropanecarboxylic Acids as Insecticides

| | % Knockdown | | |
|---|---|---|---|
| | After 15 Minutes | After 1 Hour | % Mortality after 48 Hours |
| Insecticide | | | |
| Product of Ex. 1 | 100 | 100 | 100 |
| Product of Ex. 2 | 25 | 0 | 0 |
| Product of Ex. 3 | 40 | 20 | 0 |
| Product of Ex. 4 | 20 | 30 | 20 |
| Product of Ex. 5 | 100 | 25 | 50 |
| Product of Ex. 9 | 100 | 25 | 25 |
| Pyrethrin | 100 | 100 | 100 |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. The method of controlling insects which comprises contacting the insects with an insecticidal amount of a compound having the structure formula

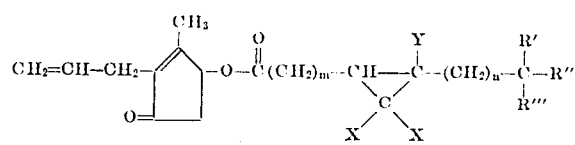

wherein each X represents methyl or chlorine; Y represents hydrogen or methyl; R' represents hydrogen, hydroxyl, or methyl; R'' represents hydrogen, $-(CH_2)_n-COOH$, $-(CH_2)_n-COOCH_3$, $-CH_2R'$, $-CH_2OCH_3$, $-CH_2OCOH$, or $-COCH_3$; R''' represents hydrogen, $-COOR'$, or $-COCH_3$; and m and n each represents an integer in the range of 0 to 1.

2. The method of claim 1 wherein the insecticidal compound is the allethronyl ester of 2,2-dichloro-3-dimethylcyclopropanecarboxylic acid.

3. The method of claim 1 wherein the insecticidal compound is the allethronyl ester of 2,2-dimethyl-3-(β-formyl-methyl-β-acetoxyethyl)-cyclopropanecarboxylic acid.

4. The method of claim 1 wherein the insecticidal compound is the allethronyl ester of 2,2-dimethyl-3-(β,β-diacetylethyl)-cyclopropanecarboxylic acid.

5. The method of claim 1 wherein the insecticidal compound is the allethronyl ester of 2,2-dimethyl-3-(β-acetyl-γ-acetylpropanoyl)-cyclopropanecarboxylic acid.

6. The method of claim 1 wherein the insecticidal compound is the allethronyl ester of 2,2-dimethyl-3-(β-hydroxymethyl-β-acetoxyethyl)-cyclopropanecarboxylic acid.

7. A composition for controlling the growth of insects that comprises (a) 0.1 percent to 85 percent by weight of a compound having the structural formula

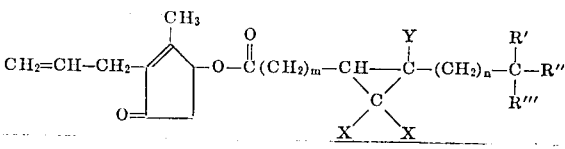

wherein each X represents methyl or chlorine; Y represents hydrogen or methyl; R' represents hydrogen, hydroxyl, or methyl; R'' represents hydrogen, $-(CH_2)_n-COOH$, $-(CH_2)_n-COOCH$, $-CH_2R'$, $-CH_2OCH_3$, $-CH_2OCOH$, or $-COCH_3$; R''' represents hydrogen, $-COOR'$, or $-COCH_3$; and m and n each represents an integer in the range of 0 to 1, and (b) an insecticide carrier.

8. A composition as set forth in claim 7 wherein the insecticidal compound is the allethronyl ester of 2,2-dichloro-3,3-dimethylcyclopropanecarboxylic acid.

9. A composition as set forth in claim 7 wherein the insecticidal compound is the allethronyl ester of 2,2-dimethyl-3-(β-formylmethyl-β-acetoxyethyl)-cyclopropanecarboxylic acid.

10. A composition as set forth in claim 7 wherein the insecticidal compound is the allethronyl ester of 2,2-dimethyl-3-(β,β-diacetylethyl)-cyclopropanecarboxylic acid.

* * * * *

UNITED STATES PATENT OFFICE
CERTIFICATE OF CORRECTION

Patent No. 3,678,172                    Dated July 18, 1972

Inventor(s) Ira D. Hill, et al.

It is certified that error appears in the above-identified patent and that said Letters Patent are hereby corrected as shown below:

Column 1, line 38, after "One" insert -- or more --.

Column 2, line 69, change
"($\beta$-formylmethyl-    $\beta$acetoxyethyl)-" to
--($\beta$-formylmethyl-$\beta$-acetoxyethyl)- --.

Signed and sealed this 12th day of December 1972.

(SEAL)
Attest:

EDWARD M. FLETCHER, JR.                ROBERT GOTTSCHALK
Attesting Officer                      Commissioner of Patents